(12) United States Patent
Stutz

(10) Patent No.: US 8,809,763 B1
(45) Date of Patent: Aug. 19, 2014

(54) OPTICAL POSITION SENSOR FOR DETERMINING THE ANGULAR POSITION OF A ROTATING DEVICE

(75) Inventor: Glenn E. Stutz, Scottsdale, AZ (US)

(73) Assignee: Lincoln Laser Company, Phoenix, AZ (US)

( * ) Notice: Subject to any disclaimer, the term of this patent is extended or adjusted under 35 U.S.C. 154(b) by 351 days.

(21) Appl. No.: 13/010,455

(22) Filed: Jan. 20, 2011

(51) Int. Cl.
*G01D 5/34* (2006.01)

(52) U.S. Cl.
USPC .................................................. 250/231.1

(58) Field of Classification Search
USPC ................. 250/231.1–231.18, 221, 233, 234; 33/1 PT, 1 N, 707; 341/13, 14
See application file for complete search history.

(56) References Cited

U.S. PATENT DOCUMENTS

| | | | |
|---|---|---|---|
| 3,480,788 A | 11/1969 | Barbieri et al. | |
| 4,056,722 A | 11/1977 | Ray | |
| 4,207,463 A | 6/1980 | Iyeta | |
| 4,698,730 A * | 10/1987 | Sakai et al. | 362/311.05 |
| 4,864,295 A | 9/1989 | Rohr | |
| 5,235,180 A | 8/1993 | Montagu | |
| 5,671,043 A | 9/1997 | Ivers | |
| 5,844,673 A | 12/1998 | Ivers | |
| 7,230,280 B2 | 6/2007 | Yaw et al. | |
| 7,688,432 B1 * | 3/2010 | Benner, Jr. | 356/138 |
| 7,940,380 B1 * | 5/2011 | Benner, Jr. | 356/138 |

* cited by examiner

*Primary Examiner* — Thanh Luu
*Assistant Examiner* — Renee Naphas
(74) *Attorney, Agent, or Firm* — Booth Udall Fuller, PLC

(57) ABSTRACT

An optical position sensor system is disclosed for determining the angular position of a rotary member having a longitudinal rotation axis that extends in an axial direction. The system includes a single light source aligned along the rotation axis. A collimating element is adjacent the light source a predetermined distance, the collimating element aligned along the rotation axis to collimate light from the light source along the rotation axis. A detection element is adjacent the collimating element a predetermined distance to receive collimated light from the collimating element and to provide a linear output. A light blocker is inserted between the collimating element and the detection element, the light blocker coupled to the rotary member to rotate therewith about the rotation axis to block portions of the collimated light from the light source and the collimating element from reaching the detection element in direct relationship to the rotary position of the light blocker.

17 Claims, 5 Drawing Sheets

OPTICAL POSITION SENSOR FOR DETERMINING THE ANGULAR POSITION OF A ROTATING DEVICE

BACKGROUND

1. Technical Field

This document relates to the accurate determination of the rotary position of a rotating device. More specifically, this document relates to an optical position sensor system for determining the angular position of a rotating device and method.

2. Background

In many applications it is important to measure and to control the angular position of a rotary element with high accuracy. For instance, galvanometers require sensors which must detect the angular position of the rotor with extreme accuracy and repeatability, high temperature stability, and high signal to noise ratio. Angular position transducers are used not only to detect the angular position of the rotatable element but also to control and hold the rotatable element in a desired position. For example, a galvanometer can be used to drive a mirror. The mirror can be used to deflect a laser beam which in turn modifies material or objects in a wide variety of applications.

There have been a number of different conventional approaches used in the sensing and detecting of rotary motion. One conventional approach uses one or more light emitting diodes (LEDs) as the light source and reflects the light off a diffuser. This approach has uniform illumination on a detector but has the disadvantage of low output signal levels and poor accuracy. Another conventional approach uses direct illumination from an LED source to illuminate a detector. This approach has good output signal levels but has the disadvantage of requiring the LED source to light blocker and light blocker to detector distances to be very small, which leads to issues with maintaining proper clearance during manufacturing.

SUMMARY

Aspects of this document relate to an optical position sensor system for determining the angular position of a rotating device and method. These aspects may comprise, and implementations may include, one or more or all of the components and steps set forth in the appended CLAIMS, which are hereby incorporated by reference.

In an aspect, an optical position sensor system is disclosed for determining the angular position of a rotary member having a longitudinal rotation axis that extends in an axial direction. The system includes a single light source aligned along the rotation axis. A collimating element is adjacent the light source a predetermined distance, the collimating element aligned along the rotation axis to collimate light from the light source along the rotation axis. A detection element is adjacent the collimating element a predetermined distance to receive collimated light from the collimating element and to provide a linear output. A light blocker is inserted between the collimating element and the detection element, the light blocker coupled to the rotary member to rotate therewith about the rotation axis to block portions of the collimated light from the light source and the collimating element from reaching the detection element in direct relationship to the rotary position of the light blocker.

Particular implementations may include one or more or all of the following.

The detection element may include four radially aligned detector segments. The four radially aligned detector segments may include four sector-shaped light detector segments.

Alternatively, each of the four radially aligned detector segments may include a photosensitive surface having a predetermined configuration, and the light blocker may include two light blocking segments. Each of the light blocking segments may be configured either slightly larger than the predetermined configuration of the photosensitive surface of one of the sector-shaped light detector segments, or to substantially match the predetermined configuration of the photosensitive surface of one of the sector-shaped light detector segments.

The system may further include a mask over the detection element. The mask may be inserted between the light blocker and the detection element. The mask may define an annular radial segment of open active detection area on each of the four radially aligned detector segments. Alternatively, the light blocker may include two light blocking segments. Each of the light blocking segments may be configured either slightly larger than the configuration of the annular radial segment of open active detection area of one of the detector segments, or to substantially match the configuration of the annular radial segment of open active detection area of one of the detector segments.

The light source may include a light emitting diode. The light emitting diode may include an attached lens that reduces beam spread from the light emitting diode.

The light blocker may have a butterfly-shaped configuration and be made of a non-reflective, opaque material.

The collimating element can be a lens. The collimating element can also be a parabolic reflector, where the light source is located within the open center of the parabolic reflector located along an axis at a focal point of the parabolic reflector.

The lens may be adjacent the light source a distance of about 0.1 to about 2.0 inches, with nominal values of about 0.2 to about 0.6 inches. The detection element may be adjacent the lens a distance of about 0.03 to about 3.0 inches, with nominal values of about 0.05 to about 0.5 inches.

The foregoing and other aspects and implementations of an optical position sensor system and method may have one or more or all of the following advantages, as well as other benefits discussed elsewhere in this document.

Implementations of an optical position sensor system may have high signal levels and do not have the close relationship requirement among the LED, light blocker and detector that conventional approaches require. This is because the collimating element is included immediately after the single LED emitter and serves to collimate the light coming from the LED. Since the collimating element collimates the light, the light blocker can be located at a convenient distance from the detector. This eliminates the possibility of contact between the two surfaces during operation. The collimated light also is not affected by the light blocker not being perfectly perpendicular to the rotation axis. The light interacting side of the light blocker faces the same direction as the sensors on the detection element while the non-light interacting side of the mask opposes the sensors. Even a slight alignment error in conventional approaches will result in signal errors.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

Figure 1:
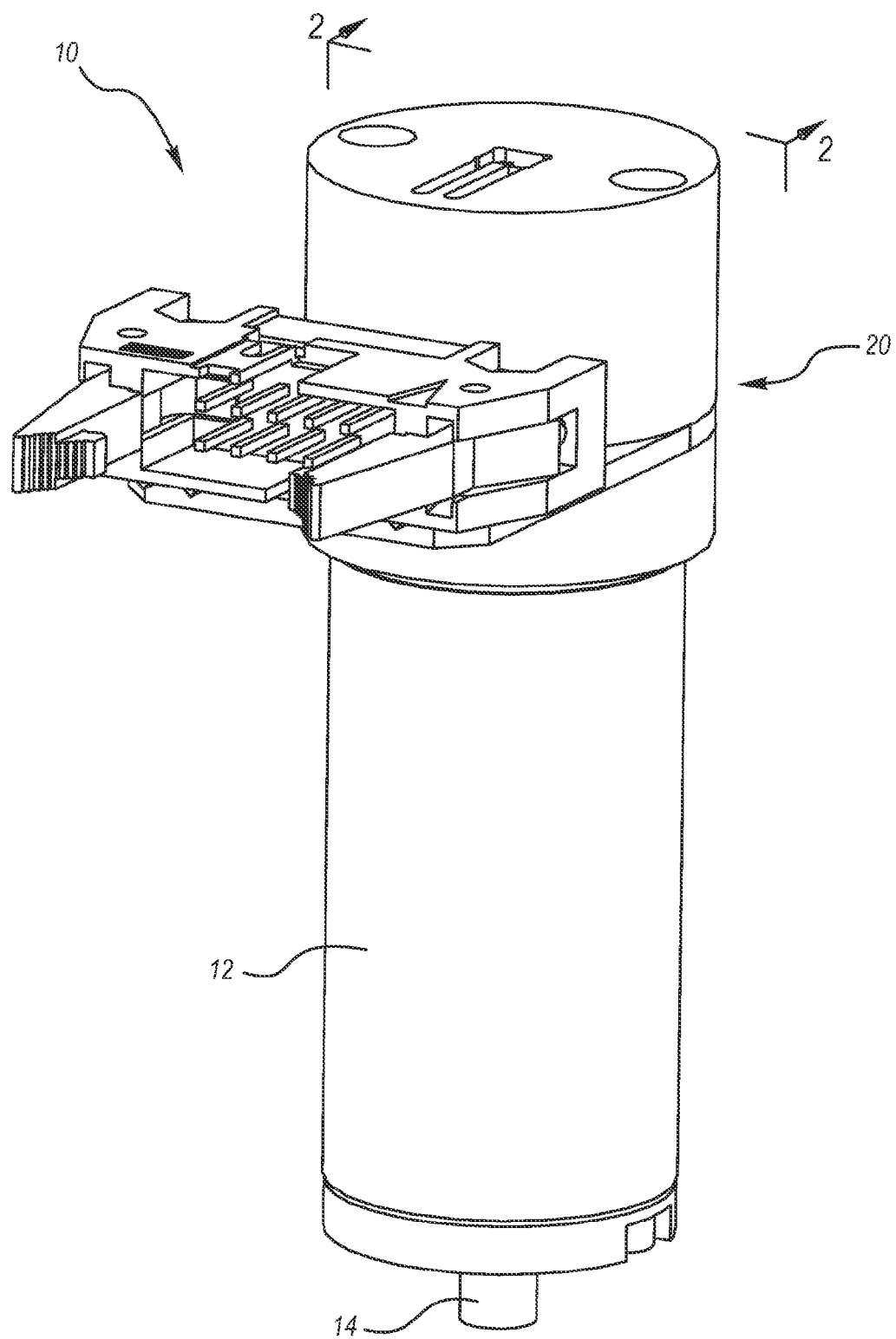
FIG. 1 is a perspective view of a galvanometer including an optical position sensor system.

This document features an optical position sensor system and method implementations. There are many features of an optical position sensor system and method implementations disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Structure

There are a variety of optical position sensor system implementations that provide for determining the angular position of a rotating device that has a longitudinal rotation axis that extends in an axial direction. In general, an optical position sensor system may generally include an optical source, a collimating element, a sensor board or detection element, and a rotating light blocker located between the source/collimating element and detection element. The rotating light blocker is specially shaped (e.g., butterfly shaped) and is keyed to/coupled and rotates with an end of the shaft.

The detection element is set up with pairs of detector segments whose outputs are summed. The light blocker allows light emanating from the single LED source to pass through to multiple detector segments or photosensors of the detection element. The signal received by each detector segment is a function of the angular position of the shaft of the rotating element. As the blocking member rotates or oscillates, it exposes more area from two of the detector segments and less area from the other two detector segments. The detector segments are diagonally cross-connected so that the summed output for one pair (e.g., (A+D) shown in FIG. 7) is increasing while the other pair (e.g., (C+B) shown in FIG. 7) is decreasing. The difference between these summed outputs ((A+D)−(C+B)) produce the final bi-directional linear output. The technique of the cross-connection has the effect of greatly reducing the sensitivity of the detector segments to spurious lateral and axial motion of the shaft.

During operation, the detector segments produce an output current proportional to the total radiant energy which falls upon their active surfaces from the single light source. With constant intensity, the output of the detector segment is proportional to the area exposed to light. It is not critical in the functioning of the optical position sensor system that the light source be located as close as possible to the detection element. In addition, it is not essential that the blocking member be located extremely close to the detection element. This is because of the collimating element which enables a single LED to be utilized. Light from the light source is collimated by the collimating element and is capable of illuminating all of the photosensors of the detection element at one time. The light falling on the photosensors is circumferentially uniform. This achieves high accuracy results. As the blocking member rotates through incremental angles it covers and uncovers new incremental photosensor areas. In order for the output to be linear, the new incremental areas must produce the same change in signals as previous incremental areas. This requires that the light intensity be circumferentially uniform.

The currents of the pairs of diametrically opposed detector segments are summed to produce a final output. The final output from the detector segments represents the angular position (angle of rotation) of the rotatable or oscillatable shaft.

Notwithstanding, turning to FIGS. 1-7 and for the exemplary purposes of this disclosure, optical position sensor system 20 is one implementation. Optical position sensor system 20 is designed to be used at one end of a rotating shaft of a rotational device such as a moving limited rotation motor (galvanometer) 10 for example incorporating therein the optical position sensor system 20. Although optical position sensor system 20 is described with respect to a moving galvanometer, it should be realized that this embodiment and other embodiments of the present invention is capable of being incorporated in and utilized with any device which requires detecting or sensing rotational or oscillational motion.

Figure 2:
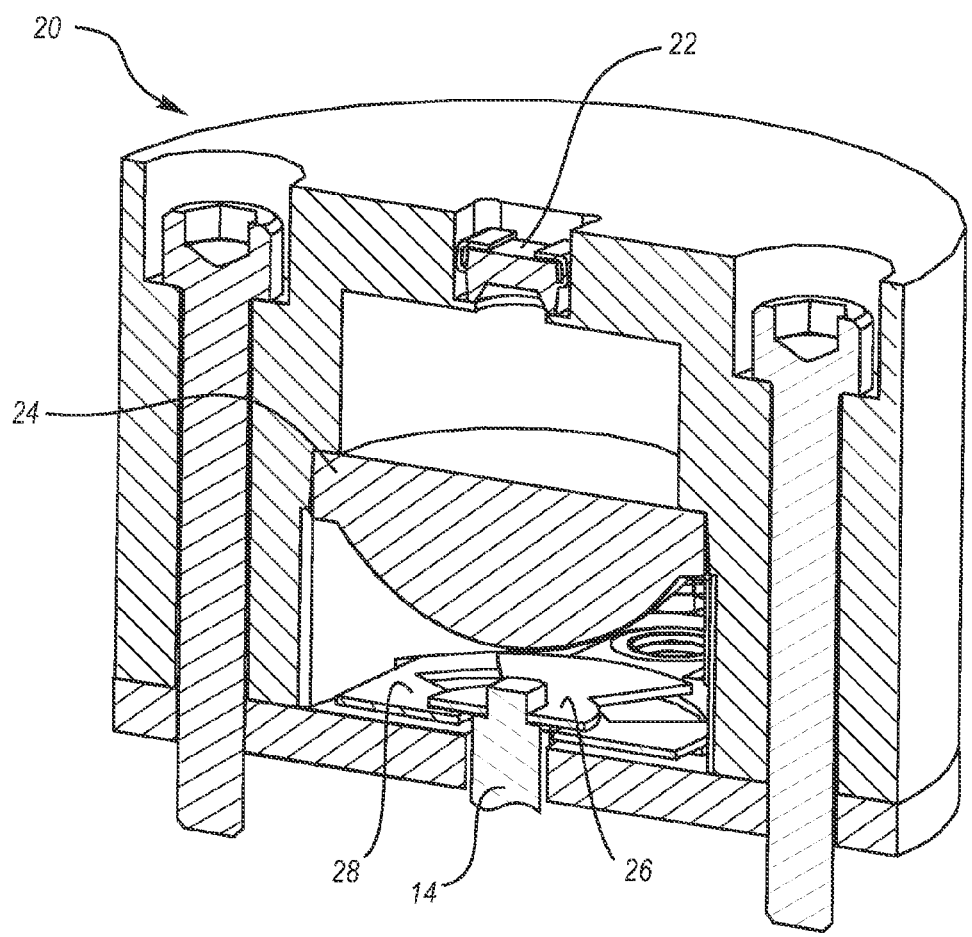
FIG. 2 is a cross-sectional perspective view of the optical position sensor system implementation of FIG. 1 taken along line 2-2 of FIG. 1.

Referring specifically to FIGS. 1 and 2, moving galvanometer 10 includes, but is not limited to, rotatable shaft or shaft assembly 14 mounted for rotational or oscillational movement within a housing 12 which makes up the galvanometer body. Since the exact details of galvanometer 10 is not required for an understanding of the present disclosure, no further description of the remaining components thereof are necessary.

In describing implementations, the following terminology will be used in accordance with the definitions and explanations set out below. Notwithstanding, other terminology, definitions, and explanations may be found throughout this document as well. This disclosure will use the terms "rotation," "rotational," "oscillation" and "oscillational" interchangeably to represent both rotational and oscillational movement of shaft 14. In addition, the terms "rotation," "rotational," "rotary" and "rotatably" define both complete rotary motion and partial rotary motion i.e., oscillation, oscillational, accurate, traverse, or oscillatory motion. Any such rotary motion can of course, be converted to or from linear motion and any such motion in two dimensions can be converted to and from motion in three dimensions.

Still referring to FIGS. 1 and 2 of the drawing, one end may have a mirror (not shown) attached to the free end of shaft 14.

The mirror can be affixed directly by any conventional means to the end of shaft 14. It is the rotational movement or oscillational movement of this mirror which is detected or sensed.

The optical position sensor system 20 is positioned adjacent the other opposite end of moving galvanometer 10. Optical position sensor system 20 is located in a housing that spatially separates optical source 22, a lens 24, a sensor board or detection element 34, and a rotating light blocker 26 from one another. This housing defines a central two tiered bore. At the end of the smaller tier of the bore the source 22 is positioned. At the end of the larger tier of the bore is the end of shaft 14. The other components are located in between source 22 and shaft 14. Lens 24 is located at the transition of the larger tier to the smaller tier (i.e., the shoulder). In this implementation, nothing is in between source 22 and lens 24 and since the diameter of the lens 24 is larger than the diameter of the smaller tier of the bore, any light that emanates from source 22 can only pass directly through lens 24 and be collimated. Detection element 34 is located at the end of the larger tier of the bore around the end of shaft 14. The rotating light blocker 26 is keyed to/coupled and rotates with the end of the shaft 14 and is located between lens 24 and detection element 34.

Describing the components of optical position sensor system 20 further, references will specifically be made to FIGS. 3A-7. Single light source 22 is axially aligned along the rotation axis of the shaft 14 and extends in the longitudinal direction. It may be an LED emitter. The LED has good rotational spatial uniformity and is placed on the same axis as the rotating shaft pointing back toward the shaft. LED source 22 illuminates portions of the four photosensors 40, 42, 44, and 46 of light detection element described below that are not covered by the light blocker 26 described below.

Again, it is not crucial in the functioning of the optical position sensor system 20 that the light source 22 be located as close as possible to the detection element 34. In addition, it is not essential that the blocking member 26 be located extremely close to the detection element 34 either. This is because of the intervening lens 24 which enables a single LED to be utilized. Light from the light source 22 is collimated by the lens 24 and is circumferentially uniform and capable of illuminating all of the photosensors of the detection element at one time. Light source 22 may be a distance, 60, from lens 24, of about 0.1 to about 2.0 inches, with nominal values of about 0.2 to about 0.6 inches. An example of an LED source 22 would be PDI-E804 made by Advanced Photonix Inc., although it should be realized that any other type of optical source can also be used.

Lens 24 is adjacent the light source 22 with no intervening components there between. The lens 24 is also axially aligned along the rotation axis of shaft 14 to collimate light from the light source 22 along the rotation axis. In order to provide the proper collimation the lens 24 needs to be mounted a fixed distance 60 from the LED 22 as explained above. The lens 24 also needs to be mounted such that there is no flexure in the mount supporting both the LED 22 and the lens 24. The lens 24 can be plano convex but many other lens shapes will work. The lens 24 may have either spherical or aspherical curvature to its surfaces. The lens 24 may also have an anti-reflection coating to reduce multiple reflections, but it may work without this.

Light blocker 26 is inserted between the lens 24 and the detection element 34, the light blocker 26 coupled to the shaft 14 to rotate therewith about the rotation axis to block portions of the collimated light 50 from the light source 22 and the lens 24 from reaching the detection element 34 in direct relationship to the rotary position of the light blocker 26.

As shown in the figures, light blocker 26 may be butterfly-shaped (shown clearly in FIGS. 3A, 3B, 4 and 6) and is coupled to an end of shaft 14. The light blocker 26 extends in the radial direction as shown in FIGS. 3A, 3B, 4 and 6 so as to partially block four large area detector segments or photosensors 40, 42, 44, and 46 making up sensor board or detection element 34. The detector segments or photosensors 40, 42, 44, and 46 of detection element 34 are positioned circumferentially about shaft 14. When optional mask 28 is employed as described below, detector segments or photosensors 40, 42, 44, and 46 are positioned circumferentially about shaft 14 as diametrically spaced arcs of a circle. The photosensitive areas (detector segments or photosensors 40, 42, 44, and 46) are partially covered by light blocker 26 which is made of an opaque material. As the light blocker 26 rotates collimated light 50 is either transmitted or blocked from reaching the detector segments or photosensors 40, 42, 44, and 46 depending on its radial location.

Light blocker 26 is keyed to the shaft 14 by molded keyway flat 27 which enables light blocker 26 to be self-aligned to the shaft 14 and to rotate therewith. The self-alignment of light blocker 26 enables it to properly align with respect to the detector segments or photosensors 40, 42, 44, and 46 of detection element 34.

Figure 3A:
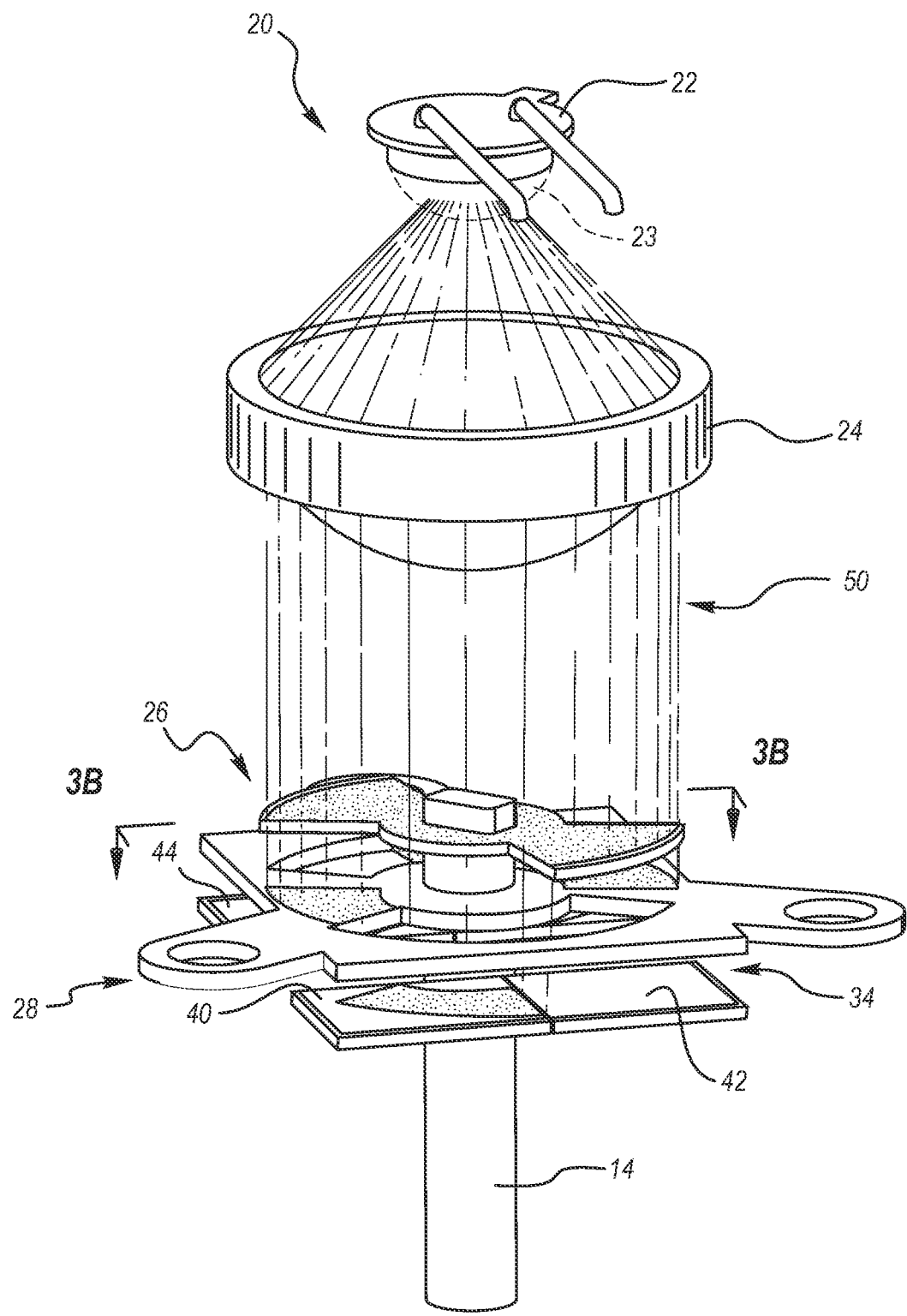
FIGS. 3A-3B are a perspective view and a cross-sectional top view taken along line 3B-3B of FIG. 3A, respectively, of the optical position sensor system of FIG. 1 depicting collimated light being partially blocked by a rotating light blocker prior to reaching the detector element.
Figure 3B:
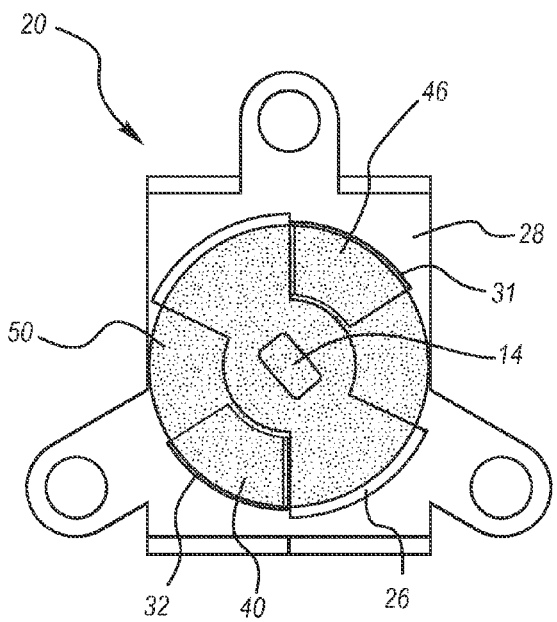
Figure 4:
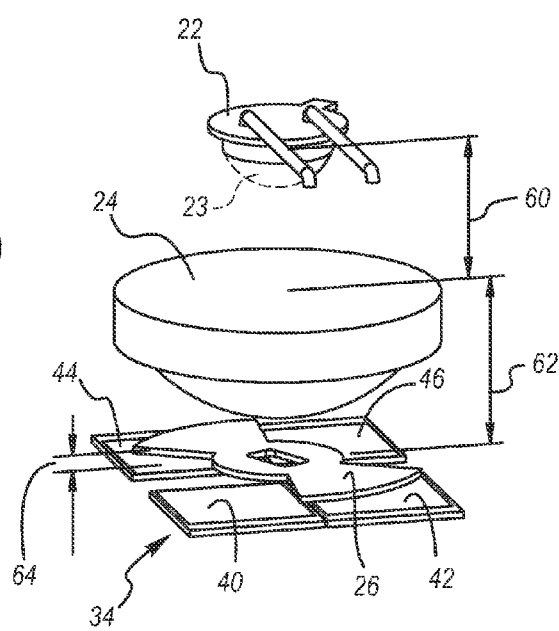
FIG. 4 is a side perspective view of the spatial arrangement of an LED, a lens, a light blocker, and a detection element of the optical position sensor system of FIG. 1.
Figure 5:
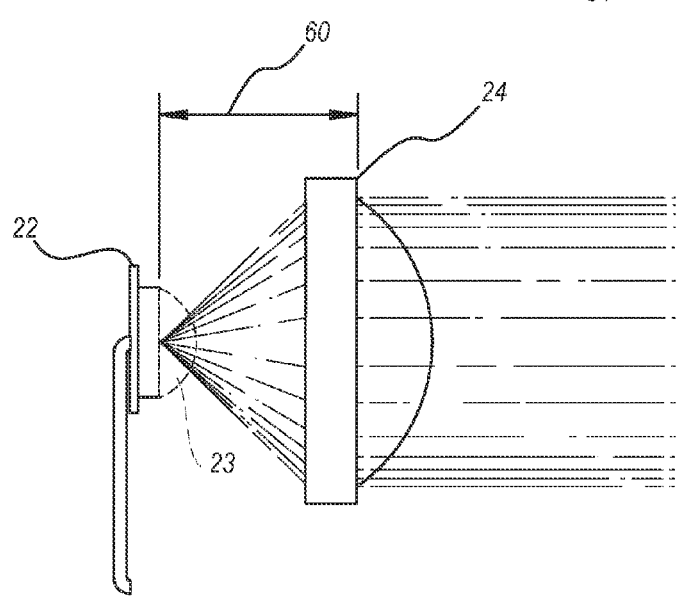
FIG. 5 is a side view of an LED illuminating a lens with it producing the collimated output.
Figure 6:
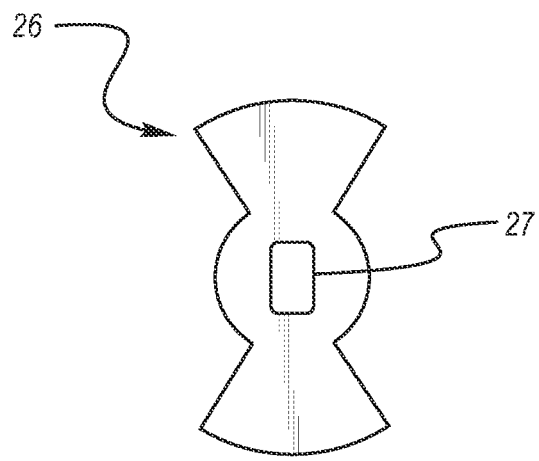
FIG. 6 is a top view of a light blocker of the optical position sensor system of FIG. 1.

Light blocker 26 is spaced from the lens by a distance, 62, about 0.03 to about 3.0 inches, with nominal values of about 0.1 to about 0.5 inches. In addition, the back surface of light blocker 26 is spaced from the photocell surfaces by a distance, 64, about 0.005 to about 2.0 inches, with nominal values of about 0.02 to about 0.5 inches. This produces a sharply defined shadow edge projected to the cell surfaces. In so doing and because the light is collimated, there is little or no chance that stray light will leak around behind the light blocker 26 and spoil the sharp contrast between illuminated and non-illuminated zones. Further, the outer diameter of the light blocker 26 may be sufficiently large to overlap the photosensitive areas as depicted in FIG. 3B, thereby aiding in the elimination of problems associated with unwanted radial movement of the shaft 14.

As light blocker 26 rotates (oscillates) it exposes more area from two of the detector segments or photosensors 40 and 46 and less of the other two detector segments or photosensors 42 and 44. The detector segments or photosensors are diagonally cross-connected so that the summed output from one pair is increasing while the other pair is decreasing. These summed outputs produce the final bi-directional linear output. The technique of cross-connection as provided herein has the effect of greatly reducing the sensitivity of the sensors to spurious lateral and axial motion. Therefore, optical position sensor system 20 can tolerate bending of the shaft 14 and/or shaft run out without producing an output equivalent to shaft rotation.

Detection element 34 is adjacent the lens 24 a predetermined distance, namely the sum of distances 62 and 64 as described previously. Detection element 34 receives collimated light from the lens 24 and provides a linear output. Detection element 34 may comprise four radially aligned detector segments or photosensors (active areas) 40, 42, 44, and 46. The detector segments 40, 42, 44, and 46 produce a current when light strikes their surface. As the shaft 14 rotates the detector segment signals are summed in such a way that the current outputs are proportional to the rotation angle of the shaft 14.

Each detector segment or photocell active area 40, 42, 44, and 46 may be in the form of a silicon chip produced by conventional wafer lithography. The detector segment or photosensors 40, 42, 44, and 46 may be sector-shaped to conform to the shape of the light blocker 26. This configuration enables the optical position sensor system 20 to produce a linear output with respect to the shaft angle.

Figure 7:
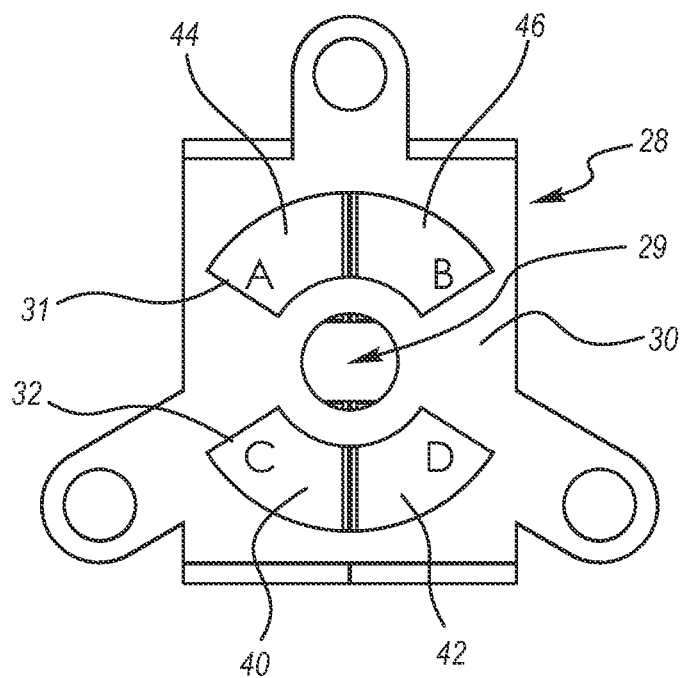
FIG. 7 is a top view of a mask and a detection element of the optical position sensor system of FIG. 1 showing the masked detection area.

Alternatively, detection element 34 may have on its surface a mask 28 that allows four annular radial segments of open active detection area. As seen in FIG. 7, mask 28 comprises a body that defines a central through hole 29 so that shaft 14 can rotate freely there through. Hole 29 is defined by a butterfly shaped opaque area 30. Area 30 separates open arced segments 31 and 32. It is these open arced segments 31 and 32 that define the sector-shaped photocell active areas or photosensors 40, 42, 44, and 46 so that they conform to the shape of the light blocker 26.

Thus, the advantage of using a lens 24 after the light source 22 is that there are no longer restrictions to small distances between the light source 22 and light blocker 26 and between the light blocker 26 and the detection element 34. Since the lens 24 collimates the light the light blocker 26 can be located at a convenient distance from the detection element 34. This eliminates the possibility of contact between the two surfaces during operation. The collimated light 50 also is not affected by the light blocker 26 not being perfectly perpendicular to the rotation axis of shaft 14.

Other Implementations

Many additional implementations are possible.

For the exemplary purposes of this disclosure, although there are a variety of optical position sensor system implementations, one such implementation may be substantially identical to optical position sensor system 20 described above, the principal difference being the use of a parabolic reflector as a collimating element instead of lens 24. In this particular implementation, the LED would be located in the open center of the parabolic reflector located along the axis at the focal point of the parabolic reflector. This structure would produce collimated output, but the central obscuration of collimated light posed provided by the LED may prevent it from being a practical solution. Such a parabolic reflector is described in U.S. Pat. No. 7,230,280, which is hereby incorporated by reference.

For the exemplary purposes of this disclosure, although there are a variety of optical position sensor system implementations, one such implementation may be substantially identical to optical position sensor system 20 described above, the principal difference being the use of an lens 23 (shown in dashed lines in the DRAWINGS) attached to light source 22 (e.g. an LED). For example, lens 23 can be a weak lens bonded to the surface of an LED. Such an attached lens 23 reduces the angular beam spread slightly from the light source 22 (e.g., LED die). The longitudinal axial position of the collimating element (e.g., lens 24) is adjusted to compensate for the presence of the attached lens 23 to provide proper collimation. Obviously, as discussed with respect to optical position sensor system 20, the collimating element (e.g., lens 24) is selected to work in conjunction with this attached lens 23 or with an LED without the attached lens.

Further implementations are within the CLAIMS.

Specifications, Materials, Manufacture, Assembly

It will be understood that implementations are not limited to the specific components disclosed herein, as virtually any components consistent with the intended operation of an optical position sensor system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of an optical position sensor system implementation. Implementations are not limited to uses of any specific components, provided that the components selected are consistent with the intended operation of an optical position sensor system implementation.

Accordingly, the components defining any optical position sensor system implementation may be formed of any of many different types of materials or combinations thereof that can readily be formed into shaped objects provided that the components selected are consistent with the intended operation of an optical position sensor system implementation. For example, the components may be formed of: rubbers (synthetic and/or natural) and/or other like materials; glasses, fiberglass, carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

For the exemplary purposes of this disclosure, lens 24 could be made of optical grade plastic or glass. Rotating blocker 26 could be made of steel or ceramic. Mask 28 could be made of steel or aluminum.

Various optical position sensor system implementations may be manufactured using conventional procedures as added to and improved upon through the procedures described here. Some components defining optical position sensor system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of optical position sensor system implementations are not limited to the specific order of steps as disclosed in this document. Any steps or sequence of steps of the assembly of optical position sensor system implementations indicated herein are given as examples of possible steps or sequence of steps and not as limitations, since various assembly processes and sequences of steps may be used to assemble optical position sensor system implementations.

Use

Implementations of an optical position sensor system are particularly useful in limited rotation motor or galvanometer applications as previously explained. The shaft can have a mirror attached to one end which is used to accurately deflect a laser to a given angle. However, implementations are not limited to uses relating to galvanometers. Rather, any description relating to galvanometer applications is for the exemplary purposes of this disclosure, and implementations may also be used in a variety of applications which require detecting or sensing rotational or oscillation movement with similar results, such as limited angle torque motor applications and other applications that could benefit from accurate position sensing over a rotation angle less than 40 degrees for example.

For the exemplary purposes of this disclosure and describing the use of optical position sensor system implementations further, reference will be made to the optical position sensor system 20 implementation. In operation, as the shaft 14 rotates or oscillates through a limited angular degree of rotation, the light blocker 26 which rotates therewith prevents a portion of the light emanating from the LED source 22 from reaching the photosensors 40, 42, 44, and 46 of detection element 34. As the shaft 14 rotates or oscillates, the photosensors 40, 42, 44, and 46 are blocked and unblocked accordingly. The light blocker 26 is made of non-reflective opaque material and, therefore, absorbs rather than reflects the light from source 22. The light blocker 26 is so configured such that it is capable, in its fully rotated position such as shown in FIGS. 3A and 3B, of completely and simultaneously preventing collimated light 50 from source 22 from reaching diametrically opposed photosensors 42 and 44. At the other end of full shaft rotation light blocker 26 prevents light from reaching photosensors 40 and 46. In the null or zero position of shaft 14, half of each photosensor 40, 42, 44, and 46 would be covered.

Detector segments or photosensors 40, 42, 44, and 46 produce an output current proportional to the total radiant energy which falls upon their active surfaces. With collimated light 50 and constant intensity, the output of the photosensor is proportional to the area exposed to light. The currents of the pairs of diametrically opposed photosensors are summed to produce a final output. That is, detector segments or photosensors 40, 42, 44, and 46 are diagonally cross-connected so that the summed output for one pair ((A+D) shown in FIG. 7) is increasing while the other pair (e.g., (C+B) shown in FIG. 7) is decreasing. The difference between these summed outputs ((A+D)−(C+B)) produces the final bi-directional linear output. The final bi-directional linear output from the photosensors represents the angular position (angle of rotation) of the rotatable (oscillatable) shaft 14. The cross connection of photocell pairs also provides for the cancellation of errors caused by possible radial movement of the rotor shaft 14 in any direction. Error cancellation occurs because the summation of the diagonally interconnected exposed areas remains constant in the event of translational movement of the light blocker 26. Therefore, radial translational movement does not produce an output equivalent to shaft rotation.

A similar compensation occurs for spurious axial shaft 14 movement. However, the compensatory effect occurs in a slightly different way, and is the result of the symmetrical on-axis geometry of optical position sensor system 20 and collimated light 50. If the light blocker 26 now moves axially, that is, along the axis of rotation there will not be any changes in the exposed areas of all four photocells because of the collimated light 50. Because of the summing-then-differencing technique described above, there will be no net change in the final output signal and therefore no sensitivity to axial movement.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. An optical position sensor system for determining the angular position of a rotary member having a longitudinal rotation axis that extends in an axial direction comprising:
   a single light source aligned along the rotation axis;
   a collimating element adjacent the light source a predetermined distance, the collimating element aligned along the rotation axis to collimate light from the light source along the rotation axis;
   a detection element adjacent the collimating element a predetermined distance to receive collimated light from the collimating element and to provide a linear output;
   a light blocker inserted between the collimating element and the detection element, the light blocker coupled to the rotary member to rotate therewith about the rotation axis to block portions of the collimated light from the light source and the collimating element from reaching the detection element in direct relationship to the rotary position of the light blocker; and
   a housing in which an end of the rotary member is mounted therein for rotational movement, the housing spatially separating the single light source, the collimating element, the detection element, and the light blocker from one another, the housing defining a central two tiered cylindrical bore comprising a transition shoulder delineating a first tier having a first diameter from a second tier having a second diameter that is larger than the first diameter.

2. The system of claim 1 wherein the detection element comprises four radially aligned detector segments.

3. The system of claim 2 wherein the four radially aligned detector segments comprises four sector-shaped light detector segments.

4. The system of claim 2 wherein each of the four radially aligned detector segments comprises a photosensitive surface having a predetermined configuration, and wherein the light blocker comprises two light blocking segments, each of the light blocking segments configured one of:
   larger than the predetermined configuration of the photosensitive surface of one of the sector-shaped light detector segments; and
   to substantially match the predetermined configuration of the photosensitive surface of one of the sector-shaped light detector segments.

5. The system of claim 2 further comprising a mask over the detection element, the mask inserted between the light blocker and the detection element.

6. The system of claim 5 wherein that mask defines an annular radial segment of open active detection area on each of the four radially aligned detector segments.

7. The system of claim 6 wherein the light blocker comprises two light blocking segments, each of the light blocking segments configured one of:
   larger than the configuration of the annular radial segment of open active detection area of one of the detector segments; and to substantially match the configuration of the annular radial segment of open active detection area of one of the detector segments.

8. The system of claim 1 wherein the light source comprises a light emitting diode.

9. The system of claim 8 wherein the light emitting diode further comprises an attached lens that reduces beam spread from the light emitting diode.

10. The system of claim 1 wherein the light blocker is of a butterfly-shaped configuration.

11. The system of claim 1 wherein the light blocker is made of a non-reflective, opaque material.

12. The system of claim 1 wherein the collimating element is one of:
   a lens; and
   a parabolic reflector, wherein the light source is located within the open center of the parabolic reflector located along an axis at a focal point of the parabolic reflector.

13. The system of claim 12 wherein the lens is adjacent the light source a distance of about 0.1 to about 2.0 inches.

14. The system of claim 13 wherein the lens is adjacent the light source a distance of about 0.2 to about 0.6 inches.

15. The system of claim 12 wherein the detection element is adjacent the lens a distance of about 0.03 to about 3.0 inches.

16. The system of claim 15 wherein the detection element is adjacent the lens a distance of about 0.1 to about 0.5 inches.

17. The system of claim 1 wherein:
   the single light source is located at an end of the smaller tier opposite the transition shoulder;
   the collimating element has a diameter larger than the diameter of the smaller tier and is located at the transition shoulder; and
   the detection element is located at an end of the larger tier opposite the transition shoulder around the end of the rotary member.

* * * * *